United States Patent

Durén et al.

[15] 3,694,713

[45] Sept. 26, 1972

[54] ULTRASONIC GENERATORS

[72] Inventors: Lennart Axel Durén; Arne Andersson, both of Nynashamn, Sweden

[73] Assignee: Amlab AB, Nynashamn, Sweden

[22] Filed: March 6, 1970

[21] Appl. No.: 17,080

[30] Foreign Application Priority Data

March 12, 1969 Sweden ......................3405/69

[52] U.S. Cl...................................318/116, 318/118

[51] Int. Cl................................................H02b 9/00

[58] Field of Search..............318/118–130, 131–135; 310/8.1, 15, 26, 25; 331/108, 117

[56] References Cited

UNITED STATES PATENTS

| | | | |
|---|---|---|---|
| 3,296,511 | 1/1967 | Van Der Burgt et al | 318/116 |
| 3,152,295 | 10/1964 | Schebler | 310/8.1 X |
| 3,439,199 | 4/1969 | Bergstrand et al | 310/26 |
| 3,518,766 | 7/1970 | Burt | 310/8.1 X |
| 3,325,747 | 6/1967 | Schrecongost | 331/117 X |
| 3,059,141 | 10/1962 | Fischman | 331/117 X |
| 3,229,129 | 1/1966 | Van Haagen | 318/118 X |
| 2,945,168 | 7/1960 | Steinke | 318/128 |
| 3,544,866 | 12/1970 | McLeroy | 318/118 |

*Primary Examiner*—Lewis H. Myers
*Assistant Examiner*—U. Weldon
*Attorney*—Zalkind, Horne & Shuster

[57] ABSTRACT

An ultrasonic generator including an amplifier coupled in oscillator configuration for initiating via an exciting impedance ultrasonic vibrations in an electro-acoustic element such as that associated with a dental instrument. Connected in parallel with the exciting impedance in an additional impedance to form a tuned parallel resonance circuit. Maximum current is supplied to the exciting impedance through the amplifier and the primary winding of a current transformer also having a secondary winding connected in series with a capacitor to form a tuned series resonance circuit additionally emphasizing the maximum current. The transformer forms an inductive coupling in phase-aiding relationship between the output circuit of the amplifier and the control electrode thereof for continuously maintaining optimal effect at the prevailing resonance frequency with an automatic adaptation of the oscillation frequency to variations from the nominal mechanical resonance frequency of the electro-acoustic element.

3 Claims, 3 Drawing Figures

Inventors:
Lennart Axel Durén
Arne Andersson
by Max Wall
attorney

ULTRASONIC GENERATORS

This invention relates to ultrasonic generators, particularly for use in dentistry, comprising an oscillator-connected amplifier with two main electrodes and one control electrode, preferably a transistor, for setting a magneto- or electrostrictive element into ultrasonic vibrations.

When exciting mechanical oscillations in, for example, magnetostrictive transformers, the frequency of the exciting effect supplied has to be in agreement with the mechanical resonance frequency, in order to obtain a good efficiency. If the mechanical resonance frequency is changed, for example owing to temperature variations, mechanical load on the oscillating system, change of elements or the like, the frequency of the drive voltage supplied has to be re-adjusted in order to maintain the output power. Heretofore, this was done usually by hand. It would, however, be desirable, particularly for use of ultrasonics in the field of dentistry, that the frequency adjustment takes place automatically, because this would considerably facilitate handling of instruments embodying an ultrasonic generator.

This objective is realized by the arrangement according to the invention, wherein automatic adjustment of the electric oscillation frequency occurs with variations in the nominal mechanical resonance frequency of the element transducer or electro-acoustic, the element being so related to the output circuit of an electronic control device, that the output current upon driving of the control electrode depends in magnitude on the resonance frequency of the element, so that the current is at maximum at this frequency, with feedback in a phase-aiding relationship to the control electrode via a transformer which is in a coupling circuit and tuned on the secondary side, whereby at prevailing resonance frequency optimum effect always is obtained.

Figure 1:
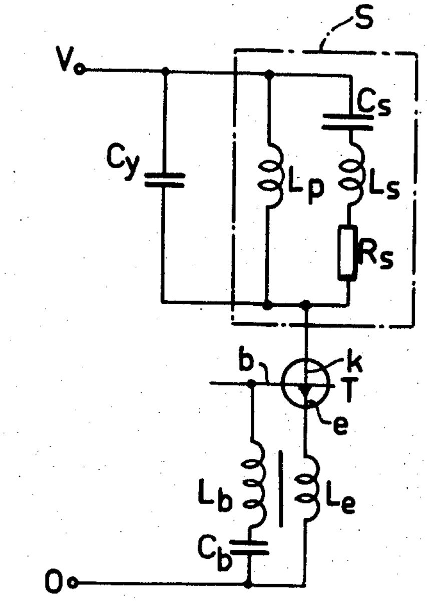
Figure 2:
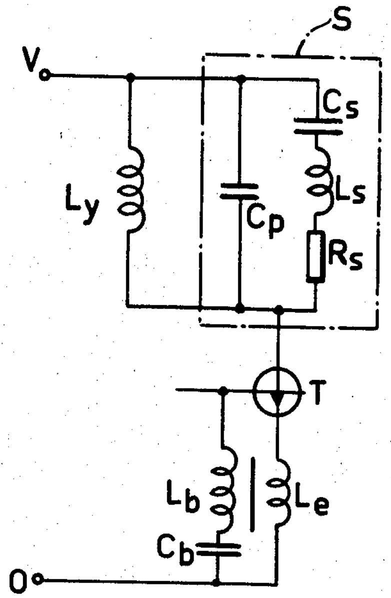
Figure 3:
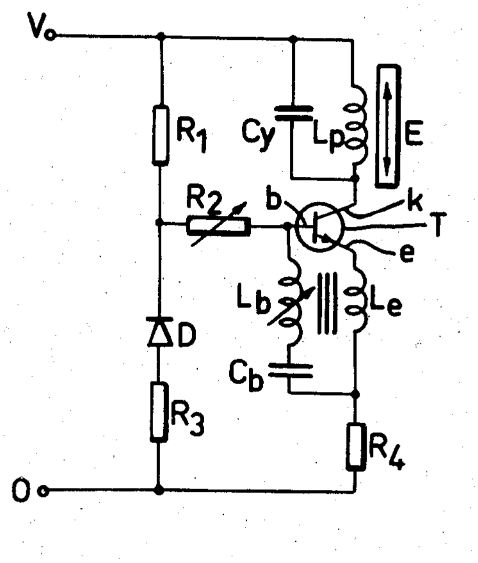

The invention is described in greater detail in the following, with reference to the accompanying drawings, in which FIGS. 1 and 2 show simple basic diagrams for an arrangement according to the invention, applied to a magnetostrictive and, respectively, piezoelectrical (electrostrictive) oscillator, and FIG. 3 shows a wiring diagram for a practical embodiment of the arrangement.

In FIGS. 1 and 2 the oscillators are represented by their equivalent diagrams framed by dash-dotted lines, where the series resonance circuit $C_s$, $L_s$, $R_s$ symbolizes the magneto- or electrostrictive elements in mechanical resonance. $L_p$ in FIG. 1 defines the static properties of the magnetostrictive oscillator, and $C_p$ in FIG. 2 defines the static properties of the electrostrictive oscillator.

In the magnetostrictive case in FIG. 1 the static inductance $L_p$ is tuned to the resonance frequency $f_0$ of the oscillator by an external capacitor. The parallel resonance circuit thus obtained is highly resistive compared to the series resonance circuit. The parallel resonance circuit is connected on one side to one pole V of a direct voltage source, such as a battery, and is connected on its other side to the collector K of a transistor T. The emitter *e* of said transistor is connected to one end of the primary winding $L_e$ of a transformer, the secondary winding $L_b$ of which in series with a capacitor $C_b$ is connected in a phase-aiding relationship between the base b of the transistor and the other end of the primary winding $L_e$, which other end is connected to the other pole, for example ground 0, of the direct voltage source.

The positive feedback required for natural oscillation takes place in the transformer $L_e/L_b$ where the secondary winding $L_b$ is tuned to the series resonance frequency $f_0$ by the capacitor $C_b$. For a fine adjustment of optimum oscillation the inductance $L_b$, for example, can be adapted to trimming.

When the base *b* of the transistor T (in a way not shown in detail) is supplied with a positive voltage pulse, a corresponding temporary increase in current is obtained in collector *k*. Said current pulse, which comprises components of varying frequency, is limited as to its magnitude by battery voltage and collector load. At the frequencies close to the series resonance frequency, the collectOr load appears low resistance and, therefore, these frequencies produce the highest current intensity in the collector-emitter circuit. These frequencies will additionally be accentuated via the tuned emitter base feedback, so that natural oscillation with dominating effect is obtained on the mechanical resonance frequency determined by the oscillator, even if said resonance frequency should vary owing to said external conditions.

The oscillation frequency, thus, is determined both by the series resonance of the oscillator and the tuning of the base, in as much as the base circuit effects the coarse tuning and the oscillator effects the fine tuning of the frequency.

In the electrostrictive case according to FIG. 2, the static capacitance $C_p$ is tuned to the resonance frequency $f_0$ of the oscillator S by an external inductance $L_v$. In the remaining respects, the function of this coupling is exactly the same as in the magnetostrictive case.

In FIG. 3 is shown a practical example of the arrangement according to the invention in a magnetostrictive oscillator where the mechanical element showing series resonance properties is indicated schematically at E. In the example shown the fixed resistance $R_1$ in combination with the adjustable resistance $R_2$ connected to the base b of transistor T provides the possibility of fine adjustment of the desired effect position, and with the series branch formed by the resistance $R_3$ and the diode the base b is protected against excessive voltages. The resistance $R_4$ balances the data spread between different copies of transistors.

The arrangement according to the invention offers the advantage that by a suitable balancing of the magnitude of the current fed back to the base of the transistor can be set into such a pulsated oscillation, that the element E during one half period is driven by the transistor to maximum change of length, while the element during its other half period is free to seek return to its rest length and in the final position receives a new drive impulse from the transistor. It was found that the element does not stop at rest position, but owing to the mechanical inertia tends to "oscillate" past said rest position. At a low inner friction of the element E, this excess oscillation is approximately of the same magnitude as the change in length forced upon it during the first-mentioned half period. Thereby it is possible, with maintained high efficiency, to avoid the otherwise necessary direct current bias magnetization of the drive coil (static inductance) $L_p$ for two-way drive of the element, as the element does not react on the polarity of the magnetic field but only to the field intensity.

The invention is not restricted to the aforedescribed embodiments, but includes different modifications obvious to persons skilled in the art within the scope of the invention. Instead of the NPN-transistor shown, for example, a transistor of PNP-type with accompanying modification of the feeding arrangement may be used. The transistor, as a matter of fact, may be replaced by an electron tube, for example a triode, with cathode, anode and control grid circuits connected analogous to the collector, emitter and base circuits of the transistor.

What we claim is:

1. In an ultrasonic generator including a sonic transducer having a nominal mechanical resonance frequency, an exciting device coupled to the transducer for inducing ultrasonic vibration in said transducer having a static impedance, tuned impedance means connected in parallel with the exciting device for establishing resonance conditions at the nominal mechanical resonance frequency of the transducer, amplifier means connected to the exciting device for driving with substantially maximum current under said resonance conditions established by the tuned impedance means, said amplifier means including an input element connected to the exciting device, an output element and a control element, feedback coupling means including an inductance means and a capacitive means connected in phase-aiding relation between the output element and the control element of the amplifier means for oscillating operation thereof at prevailing operating frequency of the transducer, said capacitive means being connected in series resonance relation to the inductive means at said nominal mechanical resonance frequency of the transducer, whereby optimum driving of the exciting device by the amplifier means is maintained despite variations from said nominal mechanical resonance frequency of the transducer.

2. The combination of claim 1, wherein said feedback coupling means includes a transformer having a primary winding connected in series with the output element of the amplifier means and a secondary winding connected to the control element and in series with the capacitive means, the transformer having a transformation ratio such that the oscillating output of the amplifier means drives the exciting device during one-half of the period of oscillation of the transducer to maximum change in length while permitting free dimensional restoration of the transducer during the other half of the period.

3. In an ultrasonic generator having a transducer, exciting means coupled to the transducer for inducing vibration thereof, parallel resonance tuning means connected to the exciting means for conducting maximum current therethrough substantially at a nominal natural resonance frequency of the transducer, variable frequency oscillator means connected to the exciting means, a source of voltage connected to the oscillator means for supply of voltage thereto at prevailing load frequency of the transducer, and series resonance tuning means connected to the oscillator means for amplifying the current fed to the exciting means within a narrow frequency band including said nominal natural resonance frequency of the transducer.

* * * * *